United States Patent [19]

Tsukamoto

[11] 4,093,833
[45] June 6, 1978

[54] MOVING COIL CARTRIDGE WITH MAGNETIC MEANS TO AFFIX STYLUS HOLDER TO CARTRIDGE CASING

[76] Inventor: Kenkichi Tsukamoto, 47, Koyamashimofusa-cho, Kita-Ku, Kyoto-Shi, Kyoto-Fu, Japan

[21] Appl. No.: 704,802

[22] Filed: Jul. 13, 1976

[30] Foreign Application Priority Data

Jul. 15, 1975 Japan .................................. 50-86422

[51] Int. Cl.² .............................................. H04R 9/16
[52] U.S. Cl. .................. 179/100.41 D; 179/100.41 K; 274/37
[58] Field of Search ............. 179/100.41 K, 100.41 D, 179/100.41 Z; 274/37

[56] References Cited

U.S. PATENT DOCUMENTS

| Re. 25,597 | 6/1964 | Dieter ................... 179/100.41 K |
| 3,062,925 | 11/1962 | Pritchard ................. 179/100.41 K |
| 3,495,838 | 2/1970 | Zimmermann ..................... 274/37 |
| 3,956,598 | 5/1976 | Kawakami et al. ................. 274/37 |

FOREIGN PATENT DOCUMENTS 1,227,040   3/1971   United Kingdom ................... 274/37

*Primary Examiner*—Raymond F. Cardillo, Jr.
*Attorney, Agent, or Firm*—George B. Oujevolk

[57] ABSTRACT

A moving coil cartridge comprises a cartridge casing with a magnet and a moving coil for converting vibration of a stylus to electrical energy and a stylus holder case having a magnetic member which is attracted by the magnet to fix the stylus holder case to the cartridge casing.

3 Claims, 6 Drawing Figures

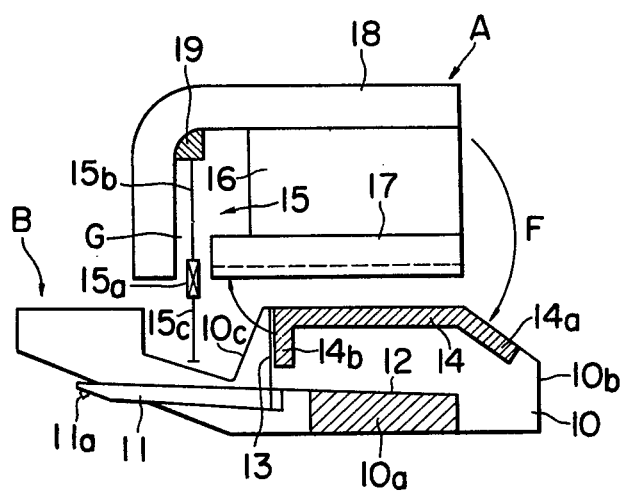
F I G. 1
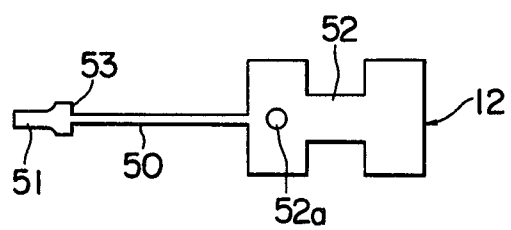
F I G. 5
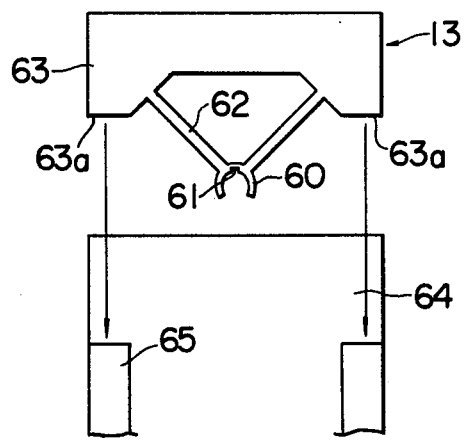
F I G. 6

4,093,833

MOVING COIL CARTRIDGE WITH MAGNETIC MEANS TO AFFIX STYLUS HOLDER TO CARTRIDGE CASING

BACKGROUND OF THE INVENTION

This invention relates to phonograph cartridges for translating stylus motion into electrical energy, and more particularly to moving coil cartridges.

In conventional moving coil cartridges, an exchanging stylus is connected to a cartridge casing by fixing an exchanging-stylus holding case (hereinafter referred to as "a stylus holder case" when applicable) thereto with engaging clamps and/or screws.

Accordingly, the process of manufacturing the conventional cartridges involves steps of providing the clamps and/or holes for the screws, and a step of aligning the cartridge casing and the stylus holder case before assembling them. These steps take a relatively long time in the manufacturing of the cartridge, thus reducing the manufacture efficiency of the conventional cartridges. Furthermore, since the engaging clamp or screw is employed for fixing the stylus holder case, it is difficult to precisely position the stylus in place, and it is also difficult to replace the stylus with a new one.

SUMMARY OF THE INVENTION

Accordingly, a primary object of this invention is to provide a moving coil cartridge in which all of the above-described difficulties accompanying conventional moving coil cartridges have been overcome.

More specifically, a primary object of the invention is to provide a moving coil cartridge in which the number of steps of manufacturing the cartridges is reduced, and replacement of a stylus can be readily achieved.

A particular object of the invention is to provide a moving coil cartridge in which its cartridge casing with a magnet and a moving coil for translating stylus motion into electrical energy can be readily and precisely combined with a stylus holder case with a stylus for transmitting the stylus motion to the moving coil.

The foregoing objects and other objects has been achieved by the provision of a moving coil cartridge comprising a cartridge casing accommodating a magnet which provides a magnetic field in its gap and a moving coil inserted into the air gap, which, according to this invention, comprises a stylus holder case with a stylus for transmitting stylus motion to the moving coil and having a magnetic member, and in which the magnet has a yoke for limiting a lateral movement of the stylus holder case, and the cartridge casing has a block for limiting a longitudinal movement of the holder case, the holder case being fixed to said cartridge casing with the aid of attractive force induced between the magnet and the magnetic member.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIG. 1 is an elevational view (with parts sectioned) showing one example of a moving coil cartridge according to this invention;

FIGS. 5 and 6 are explanatory diagrams for a description of the cantilever supporting means employed in the moving coil cartridge.

DETAILED DESCRIPTION OF THE INVENTION

One preferred embodiment of a moving coil cartridge according to this invention, as shown in FIG. 1, comprises a generator section A for translating stylus motion into electrical energy, and a vibrator section B for providing the stylus motion. These means A and B are fixed to a cartridge casing (not shown in FIG. 1).

Figure 2:
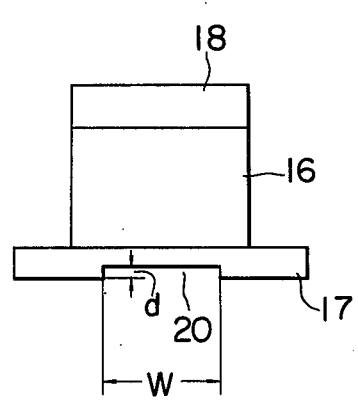
FIG. 2 is a side elevation illustrating a magnet member of the moving coil cartridge shown in FIG. 1.

The generator section A comprises a magnet 16, and yokes 17 and 18 which form an air gap G therebetween. Into the air gap G a moving coil 15a of an armature 15 in the vibrator section B is inserted. The yoke 17, as shown in FIG. 2) has a recess 20d deep and W wide extended in the longitudinal direction.

Figure 3:
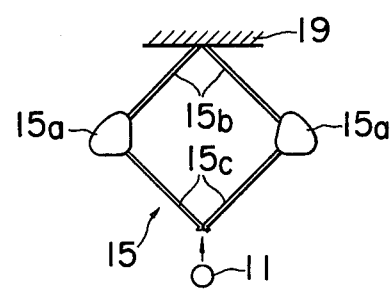
FIG. 3 is a diagram showing an armature employed in the moving coil cartridge.

The armature 15 is connected to a non-magnetic block 19 provided in the generator section A. More specifically, the armature, as illustrated in FIG. 3, is an elastic member in the form of a pantograph which is connected to the block 19 (which may be fixed to the yoke 18 of the magnet or it may be formed as a part of the cartridge body) at one end. An end of the elastic member opposite to the fixed end is adapted to engage a cantilever 11 as describe below. Two moving coils 15a are provided at the intersections of the upper arms 15b and the lower arms 15c of the pantograph-shaped elastic member, respectively.

On the other hand, the vibrator section B, as shown in FIG. 1, comprises the cantilever 11 having a stylus tip 11a fixedly connected thereto, a suspension wire 12, and a leaf spring 13. The suspension wire 12 and the leaf spring 13, as described later, are fixedly accommodated in a stylus holder case 10 to support the cantilever 11.

The stylus holder case 10 has a magnetic member 14 such as an iron piece or a magnet at its portion confronting the yoke 17. Therefore, the base 10 is attracted and fixed to the magnet 16 by the action of the magnetic flux of the magnet. The magnetic member 14 has bent portions 14a and 14b so that its sectional area passed by the flux is increased and the attractive force is increased.

The width (measured in a direction perpendicular to the drawing sheet of FIG. 1) of the case 10 is slightly smaller than the width W of the recess 20 in the yoke 17 (FIG. 2) so that the base 10 can be fitted into the recess 20. In other words, alignment in a lateral direction of the generator section and the vibrator section is obtained by inserting the base 10 into the recess 20 provided in the yoke 17.

Figure 4:
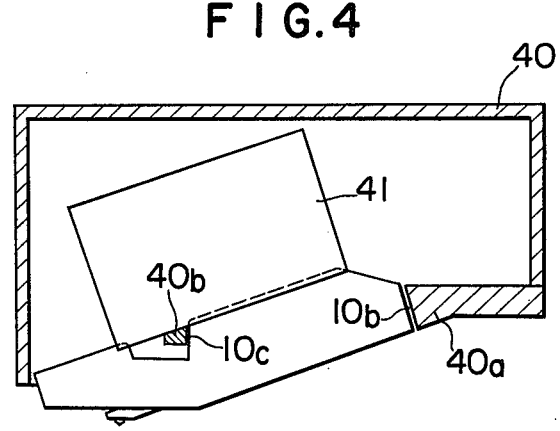
FIG. 4 is a sectional view showing the engagement of a cartridge casing and a stylus holder case according to the invention.

On the other hand, alignment in a longitudinal direction of these sections is achieved by abutting two surfaces 10b and 10c of the case 10 against retaining members or blocks 40a and 40b of the cartridge casing 40 as is shown in FIG. 4. More specifically, a part (including the magnetic member 14) of the vibrator system B is in the form of a wedge having the surfaces 10b and 10c, and this wedge-shaped part is fitted into the space defined by the blocks 40a and 40b of the casing 40.

In FIG. 4, the magnet and yokes are generally indicated by reference numeral 41.

The stylus holder case 10, and accordingly the vibrator section B thus positioned will not be moved in any direction with respect to the generator section A.

The magnet 16 of the moving coil cartridge has attractive force strong enough to attract and fix the stylus holder case 10 to which a stylus pressure (generally not more than 3 grams) is applied. The two surfaces 10b and 10c forming the wedge-shaped part of the case 10 is useful to positively fix the case to the cartridge casing 40.

Attracting the stylus holder case 10 to the magnet 16 from below allows the case 10 to positively fix to the cartridge, and simultaneously the cantilever 11 supported on the case 10 to engage the lower arms 15c of the armature 15 at the intersection thereof. (FIG. 3). Thus, the cartridge assembling work is completed.

The engagement of the cantilever with the armature is achieved in such a manner that those two elements are supported by each other through their elasticity. Therefore, no additional means is necessary for this engagement, and the two elements can be readily engaged together or disengaged from each other.

If briefly summarized, in this invention the stylus holder case 10, the yoke 17, and the cartridge casing are suitably devised so that the case 10 can be readily and positively engaged with and disengaged from the cartridge casing.

Fixing the cantilever 11 to the stylus holder case 10 will now be described.

It has been described above that the cantilever 11 is fixedly mounted on the case by means of the suspension wire 12 and the leaf spring 13.

The suspension wire 12, as shown in FIG. 5, consists of: an elongated portion 50 for substantially suspending the cantilever 11; a cantilever receiving portion 51 provided at one end of the elongated portion 50; and a fixing portion 52 for fixing the wire 12 to a fixing block 10a (FIG. 1) provided in the case 10. The shape of fixing portion 55 is made complementary with that of a recess (not shown) provided in the block 10a. The suspension wire 12 is fixedly connected to the case 10 by fixing the fixing portion 52 to the recess of the block 10a with adhesive. The fixing portion 52 has a throughhole 52a through which the adhesive applied for cementing the fixing portion to the block 10a is extruded over the surface of fixing portion 52. Thus, the provision of the holes 52a has an effect equivalent to that which is obtained by fixing the wire 12 with a rivet or a screw.

The leaf spring 13, as illustrated in FIG. 6, consists of: a cantilever holding portion 60; two elongaged elastic portions 62 connected to the cantilever holding portion 60 and forming approximately 90° with each other; and a fixing portions 63 connected to the two elongated elastic portions 62, for fixing the leaf spring 13 to the frame of the stylus holder case 10.

The cantilever holding portion 60 of the leaf spring 13 is in the form of an open ring having a gap through which the cantilever 11 is inserted into the open ring. At the top part of the ring-shaped portion 60 along the symmetry axis of the leaf spring 13 there is provided a recess 61.

The elongated portion 50 of the suspension wire 12 is inserted into this recess 61 of the leaf spring 13 in such a manner that an abutting end 53 of the suspension wire 12 is abutted against the leaf spring 13. The cantilever, the suspension wire, and the leaf spring are fixed together with adhesive applied to the cantilever receiving portion 51 and the abutting portion 53.

The leaf spring 13 is inserted from above into a gap 64 provided in the stylus holder base 10 until edges 63a of the spring 13 reach the shoulders of a block 65 provided in the case 10 to determine the vertical position of the leaf spring 13. Thereafter, the leaf spring 13 is fixed to the base by inserting an auxiliary thin plate (not shown) between the leaf spring 13 and the wall of the gap 64.

With respect to mounting the cantilever on the stylus holder case 10, the concerned parts are formed complementary in shape with each other, which facilitates the assembling of the cartridge.

As is apparent from the above description, according to this invention the stylus holder case with the cantilever, or the vibrator section can be detachably coupled to the generator section with the aid of the magnetic force of the magnet originally provided in the generator section. Accordingly, the moving coil cartridge according to the invention is advantageous in that the replacement of the stylus can be readily and positively achieved, and the assembling of the cartridge is simple, as a result of which the cartridge manufacturing efficiency is remarkably improved.

What is claimed is:

1. A moving coil cartridge device comprising:
   a. a vibrator section (B) including a cantilever stylus with a stylus holder case (10) and stylus holding means (10b, 10c) for said section;
   b. a cartridge casing (40) disposed over said vibrator means (B), said cartridge casing (40) having retaining members (40a, 40b) for retaining said holding means (10b, 10c);
   c. generator means (A) within said cartridge casing (40) for translating said stylus motion into electrical energy, said generator means (A) having a magnet (16) and yokes (17,18) with an air gap (G) for providing a magnetic field therein, a moving coil (15a) coupled to said vibrator section (B) in said air gap (G), a recess (20) in one of said yokes (17); and,
   d. a magnet member (14) on said stylus holder case (10) so disposed as to be attracted by said magnet (16) and enter said recess (20) to affix said vibrator section (B) to said generator means (A).

2. A device as claimed in claim 1 including a cantilever suspension wire (12) having an elongated portion (50), a cantilever receiving portion (51) at one end of said elongated portion, and, a fixing portion (52) for affixing the wire to the stylus holder case (10).

3. A device as claimed in claim 2 including a cantilever spring (13) having an open ring cantilever holding portion (60) with a recess (61), two elongated elastic portions (62) connected to said cantilever holding portion (60) disposed substantially at normal angles to each other, and, a fixing portion (63) connected to said two elastic portions, the elongated portion (50) of the suspension wire (12) being inserted into the recess (61) so that an abutting end (53) of said suspension wire (12) is abutted against the leaf spring.

* * * * *